United States Patent [19]

Schwindt et al.

[11] Patent Number: 5,468,833
[45] Date of Patent: Nov. 21, 1995

[54] MOISTURE CURING, ONE-COMPONENT COATING COMPOSITIONS AND THEIR USE FOR THE PRODUCTION OF COATINGS

[75] Inventors: Jürgen Schwindt, Leverkusen; Karl-Heinz Hentschel, Bergisch Gladbach; Lutz Schmalstieg, Cologne, all of Germany

[73] Assignee: Bayer Aktiengesellschaft, Leverkusen, Germany

[21] Appl. No.: 359,493

[22] Filed: Dec. 20, 1994

[30] Foreign Application Priority Data

Jan. 7, 1994 [DE] Germany .................. 44 00 224.6

[51] Int. Cl.$^6$ .................. C08G 18/00; C08G 18/70; B32B 27/00
[52] U.S. Cl. .................. 528/67; 528/44; 528/59; 528/73; 428/423.1
[58] Field of Search .................. 528/44, 59, 67, 528/73; 428/423.1

[56] References Cited

U.S. PATENT DOCUMENTS

| | | | |
|---|---|---|---|
| 4,055,548 | 10/1977 | Carleton et al. | 528/67 |
| 4,261,852 | 4/1981 | Carroll et al. | 528/67 |
| 4,456,709 | 6/1984 | Richter et al. | 528/67 |

FOREIGN PATENT DOCUMENTS

| | | |
|---|---|---|
| 013487 | 7/1980 | European Pat. Off. . |
| 92/07015 | 4/1992 | WIPO . |

OTHER PUBLICATIONS

H. Kittel, Lehrbuch der Lacke und Beschichtungen, 1973 (Month unavailable), Verlag W. A. Colomb.; vol. 1 Part 1, pp. 573 to 576.

Houben–Weyl, Methoden der organischen Chemie, vol. E20, p. 1646, Georg Thieme Verlag 1987 (Month unavailable).

*Primary Examiner*—Paul R. Michl
*Assistant Examiner*—Patrick Niland
*Attorney, Agent, or Firm*—Joseph C. Gil; Thomas W. Roy

[57] ABSTRACT

Moisture-curing, one-component coating compositions wherein the binder contains a mixture of A) 100 parts by weight of a polyisocyanate or polyisocyanate mixture of the diphenylmethane series, B) 40 to 150 parts by weight of NCO prepolymers with an NCO content of 1.5 to 12% by weight based on aromatic polyisocyanates and C) 10 to 90 parts by weight of at least one aliphatic lacquer polyisocyanate and the use of the coating compositions for the production of coatings on various substrates.

The present invention relates to moisture-curing one-component coating compositions containing as binder a polyisocyanate component containing A) 100 parts by weight of a polyisocyanate or polyisocyanate mixture of the diphenyl methane series having an NCO content of 20 to 33% by weight, B) 40 to 150 parts by weight of one or more NCO prepolymers which have an NCO content of 1.5 to 12% by weight prepared from aromatic polyisocyanates and C) 10 to 90 parts by weight of an aliphatic polyisocyanate component containing one or more lacquer polyisocyanates based on hexamethylene diisocyanate.

The present invention also relates to the use of these one-component coating compositions for coating various substrates.

13 Claims, No Drawings

MOISTURE CURING, ONE-COMPONENT COATING COMPOSITIONS AND THEIR USE FOR THE PRODUCTION OF COATINGS

BACKGROUND OF THE INVENTION

1. Field of the Invention

The present invention relates to moisture-curing, one-component coating compositions based on a polyisocyanate component containing a mixture of certain aromatic and aliphatic polyisocyanates and to the use of these coating compositions for the production of coatings.

2. Description of the Prior Art

Moisture-curing coating compositions containing organic polyisocyanates, more particularly NCO prepolymers of relatively high molecular weight, as binders are known (cf. for example H. Kittel, Lehrbuch der Lacke und Beschichtungen, 1973, Verlag W. A. Colomb.; Vol. 1, Part 2, pages 573 to 576 or Houben-Weyl, Methoden der organischen Chemie, Vol. E20, page 1646, Georg Thieme Verlag 1987). The curing reaction of the polyisocyanates with atmospheric moisture is inevitably accompanied by the formation of carbon dioxide which must escape from the coating. This results in a fundamental disadvantage of moisture-curing, one-component polyurethane lacquers, namely that lacquer systems such as these can only be applied in a maximum layer thickness of up to 300 μm. If the lacquer systems are applied in greater layer thicknesses, the carbon dioxide is unable to escape from the coating, resulting in bubble formation. Accordingly, to obtain high layer thicknesses, a moisture-curing, one-component polyurethane coating has to be applied to the substrate in several operations which is attended in particular by economic disadvantages.

Accordingly, an object of the present invention is to provide binders for one-component coating compositions which may be cured without bubbles in high layer thicknesses.

This object may be achieved with the coating compositions according to the invention which are described in detail hereinafter.

SUMMARY OF THE INVENTION

The present invention relates to moisture-curing one-component coating compositions containing as binder a polyisocyanate component containing A) 100 parts by weight of an optionally carbodiimide- and/or uretoneimine-modified polyisocyanate or polyisocyanate mixture of the diphenyl methane series having an NCO content of 20 to 33% by weight, B) 40 to 150 parts by weight of one or more NCO prepolymers which have an NCO content of 1.5 to 12% by weight and are prepared by reacting a) at least one aromatic polyisocyanate having an NCO content of 25 to 48.3% by weight with b) a less than equivalent quantity of a polyhydroxyl component containing b1) one or more polyols containing ether, ester, thioether and/or carbonate groups and having a molecular weight of 134 to 10,000, and b2) up to 40% by weight, based on the total weight of component b), of one or more monohydric to hexahydric alcohols which have a molecular weight of 32 to 300 and do not correspond to the definition of b1), and C) 10 to 90 parts by weight of an aliphatic polyisocyanate component containing one or more lacquer polyisocyanates based on hexamethylene diisocyanate and having a maximum viscosity of 3,000 mPa.s at 23° C., an NCO content of 17 to 24% by weight and a monomeric hexamethylene diisocyanate content of at most 0.5% by weight.

The present invention also relates to the use of these one-component coating compositions for coating various substrates.

DETAILED DESCRIPTION OF THE INVENTION

The binder of the coating compositions according to the invention contains a mixture of 100 parts by weight of component A), 40 to 150 parts by weight, preferably 50 to 120 parts by weight, of component B) and 10 to 90 parts by weight, preferably 20 to 70 parts by weight, of component C).

Component A) is an optionally carbodiimide- and/or uretoneimine-modified polyisocyanate or polyisocyanate mixture of the diphenylmethane series having an NCO content of 20 to 33% by weight, preferably 27 to 33% by weight. In the context of the invention, these polyisocyanates or polyisocyanate mixtures are understood to include 4,4'-diisocyanatodiphenylmethane, mixtures thereof with 2,4'- and optionally 2,2'-diisocyanatodiphenylmethane and mixtures of these isomers with higher homologs which may be obtained in known manner by the phosgenation of aniline/formaldehyde condensates. Also suitable, provided that their NCO content satisfies the preceding requirements are the known carbodiimide- and/or uretoneimine-modified polyisocyanates which may be obtained by the partial carbodiimidization of the isocyanate groups of the preceding polyisocyanates or polyisocyanate mixtures. In a preferred embodiment, component A) is a polyisocyanate mixture which is liquid at room temperature (20° C.).

Component B) is a prepolymer which contains isocyanate groups (NCO prepolymer), is prepared from aromatic polyisocyanates a) and organic polyhydroxyl compounds b) and has an NCO content of 1.5 to 12% by weight, preferably 2 to 8% by weight.

"NCO prepolymers" in this context are the theoretical monomer-free reaction products of the starting components a) and b). In practice, this means that when component B) is prepared using readily volatile starting polyisocyanates a), such as the known diisocyanatotoluene isomers (TDI), the excess TDI which is often present after prepolymer formation is removed by thin-layer distillation to a residual content of less than 1.0% by weight, preferably less than 0.5% by weight. When polyisocyanates or polyisocyanate mixtures of the diphenylmethane series, which are also suitable as component A) are used to prepare the prepolymers, the excess starting polyisocyanate, which may optionally be used, remains in the reaction product so that a mixture of polyisocyanate A) and (monomer-free) prepolymer B) is formed in situ.

Component B) is prepared in known manner by reacting polyisocyanates a) with polyhydroxyl component b) at temperatures of 20° to 140° C., preferably 40° to 100° C. If a volatile diisocyanate, such as TDI, is used as component a), the reaction of a) with b) is preferably carried out with a large NCO excess, corresponding to an NCO/OH equivalent ratio of 2:1 to 40:1 and preferably 5:1 to 12:1, after which the unreacted isocyanate excess is removed by distillation.

If polyisocyanates of the diphenylmethane series are used as polyisocyanates a) for the production of component B), a relatively large excess of component a) may also be used. The excess can remain in the product so that a mixture of components A) and B) is formed in situ. Accordingly, when polyisocyanates of the diphenylmethane series, which are suitable as component A), are used for the preparation of component B), the polyisocyanates are preferably used in an amount corresponding to an NCO/OH equivalent ratio of 3:1 to 40:1, preferably 5:1 to 25:1, so that the resulting mixture of component A) and component B) prepared in situ corresponds to the preceding ranges relating to the weight ratios between these components.

It is also possible to add a further quantity of a polyisocyanate or polyisocyanate mixture of the diphenylmethane series to the mixture of components A) and B) prepared in situ to increase the percentage of component A) in the mixture. In another embodiment of the present invention for the in situ formation of mixtures of components A) and B), part of the polyisocyanate or polyisocyanate mixture suitable as component A) is reacted with a less than equivalent quantity of polyhydroxyl compound b1); a further quantity of a polyisocyanate or polyisocyanate mixture suitable as component A) is reacted with a less than equivalent quantity of alcohol b2); and the two reaction products are subsequently mixed with one another. In this embodiment it is important to ensure that the quantities in which starting components A), b1) and b2) are used are selected such that the resulting reaction products corresponds to the preceding ranges relating to the weight ratios between components A) and B).

Monomeric polyisocyanates a), which are suitable for the production of component B), include aromatic polyisocyanates having an NCO content of 25 to 48.3% by weight. Preferably the aromatic polyisocyanates are selected from known aromatic polyisocyanates such as 2,4-diisocyanatotoluene; mixtures thereof with up to 35% by weight, based on the weight of the mixture, of 2,6-diisocyanatotoluene; or polyisocyanates or polyisocyanate mixtures of the diphenylmethane series that are suitable for use as component A). When mixtures of components A) and B) are not prepared in situ, polyisocyanate component A) and the polyisocyanates a) used for the preparation of the NCO prepolymers B) may be different.

The polyhydroxyl component b) used for the preparation of NCO prepolymers B) is selected from polyhydroxyl compounds b1) which contain ether, ester, thioether and/or carbonate groups and have a molecular weight of 134 to 10,000, preferably of 500 to 4,000; and mixtures of polyhydroxyl compounds b1) with up to 40% by weight, preferably up to 20% by weight, based on the total weight of component b), of monohydric to hexahydric alcohols which have a molecular weight of 32 to 300 and do not correspond to the definition of b1). Component b) is preferably made up solely of polyhydroxyl compounds b1).

Suitable polyhydroxyl compounds b1) are the polyhydroxyl compounds containing ether, ester, thioether and/or carbonate groups that are known from polyurethane chemistry and have molecular weights in the range mentioned above. References to molecular weight throughout the application refer to the number average molecular weight, which may be calculated from the hydroxyl group content and the hydroxyl functionality.

Preferred polyhydroxyl compounds b1) include polyether polyols, which may be obtained in known manner by the alkoxylation of suitable starter molecules, preferably using ethylene oxide and/or propylene oxide. Suitable starter molecules include the monomeric polyhydric alcohols described in more detail hereinafter as component b2) and also amines (such as ethylenediamine, hexamethylenediamine and aniline) or aminoalcohols (such as ethanolamine or propanolamine). Mixtures of the starter molecules may also be used. The preferred polyether polyols suitable as component b1) preferably have an average hydroxyl functionality of 2 to 4.

Preferred polyhydroxyl compounds b1) also include polyhydroxyl compounds containing ether and ester groups, preferably those having an average hydroxyl functionality of 2 to 3 and an average hydroxyl value of 40 to 90, for example those described in DE-OS 4 102 341 (U.S. Pat. No. 5,151,484, herein incorporated by reference) for the production of NCO prepolymers. These polyols may be produced by the reaction of polyether polyols having an average hydroxyl functionality of 4 to 6 and a hydroxyl value of 200 to 600 with less than equivalent quantities of a carboxylic acid component. Suitable carboxylic acid components are, in particular, saturated or unsaturated aliphatic monocarboxylic acids containing 8 to 24 carbon atoms per molecule, optionally in admixture with up to 20 carboxyl-equivalent percent, based on all the carboxylic acids, of polybasic carboxylic acids containing 2 to 10 carbon atoms.

Suitable monocarboxylic acids include 2-ethylhexanoic acid, palmitic acid, stearic acid, soybean oil fatty acid, peanut oil fatty acid, safflower oil fatty acid and tall oil fatty acid. Suitable polybasic carboxylic acids include adipic acid, phthalic acid and terephthalic acid.

The preferred alcohols b1) have an average hydroxyl functionality of 2 to 3.

Optional alcohols b2) include monohydric or hexahydric alcohols having a molecular weight of 32 to 300 which are different from alcohols b1). Examples of these alcohols include monomeric, monohydric or polyhydric alkanols such as methanol, ethanol, n-hexanol, 2-ethylhexanol, ethylene glycol, propylene glycol, glycerol, trimethylol propane, pentaerythritol and/or sorbitol; aminoalcohols such as ethanolamine or N,N-dimethyl ethanolamine; and diethylene glycol. When aminoalcohols containing tert.nitrogen atoms, such as N,N-dimethyl ethanolamine, are used as component b2), nitrogen atoms simultaneously acting as catalysts are incorporated in the binders.

Component C) is a lacquer polyisocyanate based on hexamethylene diisocyanate which has a maximum viscosity at 23° C. of 3,000, preferably 2,000 and more preferably 1,000 mPa.s. The NCO content of these lacquer polyisocyanates is generally between 17 and 24% by weight. Their monomeric hexamethylene diisocyanate content is less than 0.5% by weight.

These lacquer polyisocyanates are, in particular, derivatives of hexamethylene diisocyanate produced in known manner by biuretization, cyclotrimerization, dimerization, allophanatization and/or urethanization of hexamethylene diisocyanate. Processes for the production of these lacquer polyisocyanates are described, for example, in EP-A-0 010 589, DOS 3 810 908, U.S. Pat. No. 4,614,785, U.S. Pat. No. 3,903,127, EP 377 177, EP-A 496 208, EP-A 524 501 and EP-A 524 500. In a particularly preferred embodiment, component C) is a hexamethylene diisocyanate derivative containing allophanate, isocyanurate and/or uretdione groups and having a maximum viscosity (at 23° C.) of 1,000 mPa.s.

By virtue of the low reactivity of aliphatic polyisocyanates in comparison with aromatic polyisocyanates, it is also possible in principle to incorporate component C) during the actual preparation of component B), although this procedure is less preferred.

The polyisocyanate mixtures according to the invention cure without bubble formation under the influence of atmospheric moisture, even in surprisingly high layer thicknesses of up to 500 μm. The full curing of the lacquers is surprisingly quick, i.e., the curing process is unexpectedly not delayed by the presence of the sluggishly reacting aliphatic lacquer polyisocyanates C).

By virtue of the fact that they cure in high layer thicknesses without bubble formation, the polyisocyanate mixtures according to the invention are eminently suitable for use as binders for moisture-curing, one-component coating compositions for various substrates. The polyisocyanate mixtures according to the invention may be processed without additives as solventless clear lacquers or may be mixed with known lacquer additives.

Suitable additives include fillers, pigments, solvents, siccatives, catalysts, flow control agents and the like. The fact that coating compositions of extremely low solvent content can be produced due to the particularly low viscosity of polyisocyanate component C) is of particular advantage.

In the production of ready-to-use coating compositions, it is possible and often useful to mix all or a part of the additives with a portion of the binder components A) to C) to form a premix and subsequently to mix the premix with the remaining components of the lacquer. It is merely important to ensure that the individual binder components A) to C) in the coating compositions ultimately obtained correspond to the preceding ranges relating to the weight ratios between these components.

In the following examples, all parts and percentages are by weight unless otherwise indicated.

Figures relating to the quantitative composition of the polyisocyanate mixtures set forth in the examples are approximate calculated values which are merely intended to show that the composition of the mixtures mentioned in the examples lies within the ranges according to the invention. Since a large excess of isocyanate component 1 was always used in the in situ preparation of mixtures of components A) and B), the calculation was based on the assumption that no chain-extending reaction occurred in the preparation of the mixtures. The calculation was also based on the assumption that the remaining unreacted excess of isocyanate component 1 consisted solely of diisocyanates (molecular weight= 250). The exact quantitative composition of the mixtures can be determined, for example, by gel permeation chromatography.

EXAMPLES

The following starting components are used in the Examples:

Isocyanate component 1 (component A)

A polyisocyanate mixture of the diphenylmethane series containing 4.2% by weight of 2,2'-, 36.8% by weight of 2,4'- and 48% by weight of 4,4'-diisocyanatodiphenylmethane and of 11% by weight of higher homologs of these diisocyanates, and having an NCO content of 31.5% and a viscosity of 50 mPa.s (23° C.).

Isocyanate component 2 (component B)

A solvent-free, urethane-modified polyisocyanate prepared by reacting 2,4-diisocyanatotoluene with a polyether (molecular weight 3,000) obtained by the propoxylation of glycerol. The isocyanate-containing prepolymer had an NCO content of 3.2% and a viscosity of 8,000 mPa.s (23° C.). Since the diisocyanate was not used in excess, based on the polyether, there was no need to remove monomeric diisocyanate by distillation, i.e. the reaction product was substantially monomer-free (<0.5%).

Isocyanate component 3—Mixture prepared in situ of component A) and the reaction product of polyisocyanate A) with an alcohol b2)

760 g of isocyanate component 1 were stirred with 240 g of 2-ethylhexanol for about 2 h at 60° C. until a constant NCO content of 15.9% was reached. The product had a viscosity of 700 mPa.s (23° C.) and a content of unreacted isocyanate component 1 of 24%.

Isocyanate component 4—Mixture prepared in situ of polyisocyanate component A) and polyisocyanate component B)

2032 g of isocyanate component 1 were prepolymerized in the presence of 9 g of N,N-dimethyl ethanolamine for 4 hours at 60° C. with 1,400 g of a polyether diol (OH number 28) prepared by propoxylation of propylene glycol and subsequent ethoxylation of the propoxylation product (PO:EO ratio by weight 80:20). The NCO prepolymer obtained had a viscosity of 500 mPa.s (23° C.) and an NCO content of 17.5%. It was a mixture of unreacted excess starting polyisocyanate A) with an NCO prepolymer B) in a ratio by weight of 0.96:1.

Isocyanate Component 5—Mixture of polyisocyanate component A) with NCO prepolymer B)

I) Polyol containing ether and ester groups according to U.S. Pat. No. 5,151,484.

4,633 g of a 90% aqueous solution of a polyether polyol (OH number 450) prepared by the propoxylation of sorbitol were condensed under nitrogen with 6230 g of soybean oil fatty acid with elimination of water. A polyol containing ether and ester groups and having an OH number of 66, an average functionality of 2 and a viscosity of 310 mPa.s (23° C.) was obtained.

II) Polyisocyanate production 1,355 g of isocyanate component 1 were prepolymerized for 4 hours at 60° C. with 300 g of a polyether diol (OH number 28) prepared by the propoxylation of propylene glycol and subsequent ethoxylation of the propoxylation product (PO:EO ratio by weight 80:20), 8 g of N,N-dimethyl ethanolamine and 340 g of polyol I) containing ether and ester groups.

The prepolymer obtained has an NCO content of 16.5% and a viscosity of 200 mPa.s (23° C.). It was a mixture of a polyisocyanate component A) and an NCO prepolymer B) in a ratio by weight of 1.2:1.

Isocyanate component 6 (component C)

A hexamethylene diisocyanate-based polyisocyanate mixture containing uretdione and isocyanurate groups prepared in accordance with DE-OS 3 900 053 (U.S. Pat. No. 4,994,451) and having an NCO content of 21.6% and a viscosity of 200 mPa.s (23° C.).

Isocyanate component 7 (component C)

An n-butanol/hexamethylene diisocyanate-based polyisocyanate containing allophanate and isocyanurate groups prepared in accordance with EP-A 524 501 (U.S. Pat. No. 5,124,427) and containing isocyanurate groups and allophanate groups in a molar ratio of 1:1; NCO content 19.4%, viscosity 800 mPa.s (23° C.).

EXAMPLE 1

Production of a clear coating according to the invention 60 parts by weight of isocyanate component 5, 20 parts by weight of isocyanate component 6 and 20 parts by weight of isocyanate component 1 were thoroughly mixed. Since isocyanate component 5) contained a portion of polyisocyanate A), the mixture contained 100 parts by weight of component A), 51.6 parts by weight of component B) and 37.9 parts by weight of component C). A film knife-coated without solvent onto a glass plate in a layer thickness of 500 μm dries to form a glossy, bubble-free coating. The coating was sand-dry after 2 hours and fully dry after only 5 hours. After storing for 7 days at room temperature, the film reached a pendulum hardness of 180 seconds.

Comparison Example 1

60 parts by weight of isocyanate component 5 and 20 parts by weight of isocyanate component 1 were thoroughly mixed. A film applied without solvent to a glass plate in a layer thickness of 500 μm formed large bubbles during drying and separated from the substrate. The mixture was unusable as a binder for thick-layer coatings.

EXAMPLE 2

Production of a clear coating according to the invention 60 parts by weight of isocyanate component 4, 20 parts by weight of isocyanate component 7 and 20 parts by weight of isocyanate component 1 were thoroughly mixed. Since isocyanate component 5) contained a portion of polyisocyanate A), the mixture contained 100 parts by weight of component A), 62.1 parts by weight of component B) and 40.5 parts by weight of component C). A film knife-coated without solvent onto a glass plate in a layer thickness of 500 μm dried to form a glossy, bubble-free coating. The coating was sand-dry after 2 hours and fully dry after only 5 hours. After storing for 7 days at room temperature, the film reached a pendulum hardness of 185 seconds.

Comparison Example 2

60 parts by weight of isocyanate component 4 and 20 parts by weight of isocyanate component 1 were thoroughly mixed. A film applied without solvent to a glass plate in a layer thickness of 500 μm formed large bubbles during drying and separated from the substrate. The mixture was unusable as a binder for thick-layer coatings.

EXAMPLES 3

This example describes a coating composition according to the invention containing an inert pigment suitable for the production of primers and its use for the production of a primer. In this example, isocyanate component B) contains a mixture of isocyanate components 2, 3 and 5. The coating was applied by air gun to sand-blasted steel plates.

| Constituents of the coating composition according to the invention: | |
| --- | --- |
| I) Isocyanate component 3 | 138 parts by weight |
| Isocyanate component 2 | 23.4 parts by weight |
| Isocyanate component 6 | 46.2 parts by weight |
| Isocyanate component 1 | 46.2 parts by weight |
| Acronal 700 L (flow control agent, 10% solution in ethylacetate, a product of BASF, Ludwigshafen) | 5.8 parts by weight |
| HDK H 15 (thickener, a product of Wacker Chemie, Munich) | 17.2 parts by weight |
| EFKA 46 (wetting agent, a product of EFKA Chemicals B.V., Hillegom, Netherlands) | 14 parts by weight |
| Solvent naphtha 100 | 100 parts by weight |
| II) Bayferrox 130 BM (iron oxide pigment, a product of Bayer AG, Leverkusen) | 168 parts by weight |
| Leaf silicate BS 30 (filler, a product of Naintsch, Graz, Austria) | 187 parts by weight |
| Heavy spar EWO (filler, a product of Sachtleben, Duisburg) | 285.6 parts by weight |
| III) Isocyanate component 5 | 276.8 parts by weight |
| Isocyanate component 6 | 46.2 parts by weight |
| Solvent naphtha 100 | 55 parts by weight |

The solvent, flow control agent, rheology aid and isocyanate component from I) were mixed in a dispersion vessel. The pigments and fillers from II) were then added with slow stirring. The mixture was then dispersed without stirring for about 30 minutes at a rotational speed of the dissolver disk of 15 m/s. This temperature of the mixture rose to 50°–65° C. and dispersion was terminated after about 30 minutes. Finally, the components from III) were successively stirred in.

The coating composition obtained had the following characteristic data:

| | |
| --- | --- |
| Pigment volume concentration: | 25% |
| Solids content: | 86.5% |
| VOC value: | 170 g/l |

The coating composition contained 110.2 parts by weight of component B) and 40.1 parts by weight of component C) to 100 parts by weight of polyisocyanate component A).

The coating composition was sprayed onto sand-blasted steel plates, an effort being made to obtain a thick layer. Evaluation was carried out after drying for 3 days at around 20° to 25° C. in a layer thickness of up to 300 μm, the lacquer according to the invention did not show any signs of running and, in even greater layer thicknesses, did not form any bubbles. The coating was sand-dry after 2 h and fully dry after 4 h.

Creepage from a cut was tested in accordance with DIN 53167 (salt spray mist test) while bubble formation was tested in accordance with DIN 53209. Evaluation was carried out after 42 days under test:

| | |
| --- | --- |
| Layer thickness: | 120 μm |
| Creepage: | None |
| Bubble formation: | None |

EXAMPLE 4

This example describes a low-solvent coating composition according to the invention and its use for the production of a thick-layer coating by means of an airless spray gun on the primed steel plates obtained from Example 3. In this example, isocyanate component B) contains a mixture of isocyanate components 2, 3 and 5.

| Constituents of the coating composition according to the invention: | | |
|---|---|---|
| I) Isocyanate component 3 | 51.1 | parts by weight |
| Isocyanate component 2 | 8.5 | parts by weight |
| Isocyanate component 6 | 17 | parts by weight |
| Isocyanate component 1 | 17 | parts by weight |
| HDK H 15 (thickener, a product of Wacker Chemie, Munich) | 8 | parts by weight |
| Acronal 700 L (flow control agent, 10% Solution in ethylacetate, a product of BASF) | 2 | parts by weight |
| Methoxypropyl acetate/ painter's naphtha 2:1 | 92.5 | parts by weight |
| Heavy spar EWO (filler, a product of Sachtleben, Duisburg) | 130.7 | parts by weight |
| II) Isocyanate component 6 | 17 | parts by weight |
| Isocyanate component 5 | 102 | parts by weight |
| III) Methoxypropyl acetate/ painter's naphtha 2:1 | 57.5 | parts by weight |
| Stapa 2 mi (Al-bronze, a product of Eckart, Werke, Fürth) | 50.5 | parts by weight |
| Micaceous iron ore Miox A/S (Kärntener Montanindustrie, Klagenfurt, Austria) | 204.4 | parts by weight |

The solvent, flow control agent, rheology aid and the isocyanate component from I) were mixed in a dispersion vessel. The pigments and fillers were then added with slow stirring. The mixture was then dispersed without stirring for about 30 minutes at a rotational speed of the dissolver disk of 15 m/s. Under these conditions, the temperature quickly rose to 50°–65° C.; dispersion was terminated after 30 minutes.

The isocyanate components from II) were then slowly stirred in. After the components from III) had been added, the mixture was dispersed for 10 minutes at a rotational speed of the dissolver disk of 10 m/s.

The ready-to-use coating composition obtained had the following characteristic data:

| Pigment volume concentration: | 41% |
|---|---|
| Solids content: | 79.4% |
| VOC value: | 310 g/l |

The coating composition contained 109.9 parts by weight of component B) and 39.9 parts by weight of component C) per 100 parts by weight of polyisocyanate component A).

The coating composition was sprayed onto primed steel plates, an effort being made to obtain thick layers. Evaluation was carried out after drying for 3 days at about 20° to 25° C./60% relative air humidity.

In a layer thickness of up to 300 μm, the coating according to the invention did not show any signs of running and, in an even greater layer thickness, did not show any bubble formation.

The coating was sand-dry after 2.5 h and fully dry after 5 h.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. The present invention relates to moisture-curing one-component coating compositions containing as binder a polyisocyanate component consisting essentially of A) 100 parts by weight of an optionally carbodiimide- and/or uretoneimine-modified polyisocyanate or polyisocyanate mixture of the diphenyl methane series having an NCO content of 20 to 33% by weight, B) 40 to 150 parts by weight of one or more NCO prepolymers which have an NCO content of 1.5 to 12% by weight and are prepared by reacting a) at least one aromatic polyisocyanate having an NCO content of 25 to 48.3% by weight with b) a less than equivalent quantity of a polyhydroxyl component containing b1) one or more polyols containing ether, ester, thioether and/or carbonate groups and having a molecular weight of 134 to 10,000, and b2) up to 40% by weight, based on the total weight of component b), of one or more monohydric to hexahydric alcohols which have a molecular weight of 32 to 300 and do not correspond to the definition of b1), and C) 10 to 90 parts by weight of an aliphatic polyisocyanate component containing one or more lacquer polyisocyanates based on hexamethylene diisocyanate and having a maximum viscosity of 3,000 mPa.s at 23° C., an NCO content of 17 to 24% by weight and a monomeric hexamethylene diisocyanate content of at most 0.5% by weight.

2. The coating composition of claim 1 wherein component a) consists of a polyisocyanate or polyisocyanate mixture of the diphenylmethane series.

3. The coating composition of claim 1 wherein component b) consists essentially of b1) polyols containing ether and/or ester groups and having a molecular weight of 500 to 4,000 and an average hydroxyl functionality of 2 to 4.

4. The coating composition of claim 2 wherein component b) consists essentially of b1) polyols containing ether and/or ester groups and having a molecular weight of 500 to 4,000 and an average hydroxyl functionality of 2 to 4.

5. The coating composition of claim 3 wherein component b1) comprising (i) polyether polyols containing ester groups which are based on the reaction product of one or more polyether polyols having a hydroxyl number of 200 to 600 with a carboxylic acid component containing at least one monocarboxylic acid having 8 to 24 carbon atoms and optionally up to 20 carboxyl equivalent percent, based on the total equivalents of carboxylic acid groups, of polybasic organic carboxylic acids containing up to 10 carbon atoms and optionally (ii) polyether polyols free from ester groups.

6. The coating composition of claim 4 wherein component b1) comprising (i) polyether polyols containing ester groups which are based on the reaction product of one or more polyether polyols having a hydroxyl number of 200 to 600 with a carboxylic acid component containing at least one monocarboxylic acid having 8 to 24 carbon atoms and optionally up to 20 carboxyl equivalent percent, based on the total equivalents of carboxylic acid groups, of polybasic organic carboxylic adds containing up to 10 carbon atoms and optionally (ii) polyether polyols free from ester groups.

7. The coating composition of claim 1 wherein component C) consists essentially of a lacquer polyisocyanate containing allophanate, isocyanurate and/or uretdione groups and having a maximum viscosity of 1,000 mPa.s at 23° C.

8. The coating composition of claim 2 wherein component C) consists essentially of a lacquer polyisocyanate containing allophanate, isocyanurate and/or uretdione groups and having a maximum viscosity of 1,000 mPa.s at 23° C.

9. The coating composition of claim 3 wherein component C) consists essentially of a lacquer polyisocyanate containing allophanate, isocyanurate and/or uretdione groups and having a maximum viscosity of 1,000 mPa.s at 23° C.

10. The coating composition of claim 4 wherein component C) consists essentially of a lacquer polyisocyanate containing allophanate, isocyanurate and/or uretdione groups and having a maximum viscosity of 1,000 mPa.s at 23° C.

11. The coating composition of claim 5 wherein component C) consists essentially of a lacquer polyisocyanate containing allophanate, isocyanurate and/or uretdione groups and having a maximum viscosity of 1,000 mPa.s at 23° C.

12. The coating composition of claim 6 wherein component C) consists essentially of a lacquer polyisocyanate containing allophanate, isocyanurate and/or uretdione groups and having a maximum viscosity of 1,000 mPa.s at 23° C.

13. A coated substrate coated with the coating composition of claim 1.

* * * * *